(12) United States Patent  
Kalfe

(10) Patent No.: US 10,173,247 B2  
(45) Date of Patent: Jan. 8, 2019

(54) ROTATING CLEANING BRUSH

(71) Applicant: Ahmet Kalfe, Bochum (DE)

(72) Inventor: Ahmet Kalfe, Bochum (DE)

(73) Assignee: Thomas Durchlaub, Bochum (DE)

( * ) Notice: Subject to any disclaimer, the term of this patent is extended or adjusted under 35 U.S.C. 154(b) by 0 days.

(21) Appl. No.: 15/241,291

(22) Filed: Aug. 19, 2016

(65) Prior Publication Data

US 2017/0050219 A1 Feb. 23, 2017

(30) Foreign Application Priority Data

Aug. 19, 2015 (DE) .................... 20 2015 104 378 U

(51) Int. Cl.
| | |
|---|---|
| *A46B 9/02* | (2006.01) |
| *A46B 13/02* | (2006.01) |
| *B08B 1/00* | (2006.01) |
| *A46B 13/00* | (2006.01) |
| *B08B 1/04* | (2006.01) |
| *B60S 3/04* | (2006.01) |
| *B60S 3/06* | (2006.01) |

(52) U.S. Cl.
CPC ................ *B08B 1/002* (2013.01); *A46B 9/02* (2013.01); *A46B 13/001* (2013.01); *A46B 13/02* (2013.01); *B08B 1/04* (2013.01); *B60S 3/042* (2013.01); *B60S 3/066* (2013.01)

(58) Field of Classification Search
CPC ......... A46B 9/02; A46B 13/001; A46B 13/02; B60S 3/042
See application file for complete search history.

(56) References Cited

U.S. PATENT DOCUMENTS

| 42,625 A | 5/1864 | Robbins et al. |
|---|---|---|
| 347,671 A | 8/1886 | Webb |
| 948,617 A | 2/1910 | Snevely |
| 2,983,939 A | 5/1961 | Marchessault |
| 3,332,098 A | 7/1967 | Smith |
| 3,526,012 A | 9/1970 | Cirino |
| 3,731,332 A | 5/1973 | Bernardi |
| 3,793,663 A | 2/1974 | Lieffring |
| 3,877,107 A | 4/1975 | Cirino |

(Continued)

FOREIGN PATENT DOCUMENTS

| DE | 299 09 346 U1 | 9/1999 |
|---|---|---|
| DE | 299 16 951 U1 | 4/2000 |

(Continued)

*Primary Examiner* — Randall Chin

(74) *Attorney, Agent, or Firm* — Norman B. Thot

(57) ABSTRACT

A rotating cleaning brush includes a connection pin to be clamped in a chuck of a machine for rotatingly driving the cleaning brush about its longitudinal axis. The cleaning brush includes a bristle carrier including a plurality of openings. The bristle carrier includes a first bristle bundle and a second bristle bundle being adjacent along the longitudinal axis. The first bristle bundle is located closer to the first end region of the cleaning brush than the second bristle bundle. Each of the bristle bundles includes a plurality of bristles and is located in one of the openings. The bristles of the first bristle bundle are designed to bend towards the longitudinal axis and then run parallel to the longitudinal axis so as to overlap the opening in which the second bristle bundle is arranged.

14 Claims, 3 Drawing Sheets

(56) References Cited

U.S. PATENT DOCUMENTS

| | | | |
|---|---|---|---|
| 3,921,242 A | | 11/1975 | Clark |
| 4,815,158 A | * | 3/1989 | Crotts .................... B60S 3/066 15/179 |
| 5,167,044 A | | 12/1992 | Belanger et al. |
| 5,715,558 A | | 2/1998 | Johnson |
| 2010/0186771 A1 | * | 7/2010 | Rahbar-Dehghan ..... A46B 9/02 134/6 |

FOREIGN PATENT DOCUMENTS

| | | |
|---|---|---|
| DE | 20 2007 013 760 U1 | 3/2008 |
| DE | 20 2014 003 325 U1 | 7/2014 |
| GB | 1055052 A | 1/1967 |

* cited by examiner

ROTATING CLEANING BRUSH

CROSS REFERENCE TO RELATED APPLICATIONS

This application claims priority to co-pending German utility model No. DE 20 2015 104 378.3 filed Aug. 19, 2015.

FIELD OF THE INVENTION

The present invention relates to a rotating cleaning brush including a connection pin to be clamped in the chuck of a machine for rotatingly driving the cleaning brush about the longitudinal axis.

Such a rotating cleaning brush may be used for cleaning rims of automobiles, for example.

BACKGROUND OF THE INVENTION

A cleaning brush is known from German Utility Model No. DE 299 09 346 U1. The cleaning brush includes a conical bristle carrier and is destined to be clamped in a chuck of a machine including a rotating drive shaft. The cleaning brush is suitable for cleaning cavities and impressions, but it is not suitable for cleaning larger surfaces.

Other rotating cleaning brushes are known from German Utility Model Nos. DE 20 2014 003 325 U1, DE 299 16 951 U1 and DE 20 2007 013 760 U1.

SUMMARY OF THE INVENTION

The present invention generally relates to a rotating cleaning brush. The rotating cleaning brush includes a longitudinal axis, a first end region and a second end region. The first end region and the second end region are spaced apart along the longitudinal axis. A connection pin is located in the first end region, and it is designed and arranged to be clamped in a chuck of a machine for rotatingly driving the cleaning brush about the longitudinal axis. The cleaning brush includes a bristle carrier having a shell surface and a top surface, the top surface being located in the second end region and having a rounded shape. The bristle carrier includes a plurality of openings being arranged in the shell surface. The bristle carrier includes a first bristle bundle and a second bristle bundle being adjacent along the longitudinal axis. The first bristle bundle is located closer to the first end region than the second bristle bundle. Each of the bristle bundles includes a plurality of bristles and is located in one of the openings. The bristles of the first bristle bundle are designed to be bent towards the longitudinal axis such that they overlap the opening in which the second bristle bundle is arranged.

Generally, the combination of the outer diameter of the bristle carrier and the length of the bristles is important for the respective field of application of the cleaning brush. Smaller outer diameters of the bristle carrier combined with longer bristles are suitable for cleaning structured and sensitive surfaces. However, the working width of such a cleaning brush is limited. Greater outer diameters of the bristle carrier combined with shorter bristles are suitable for cleaning robust surfaces being heavily soiled. However, such cleaning brushes are not suitable for cleaning structured surfaces.

The bristles of the new cleaning brush are bent towards the longitudinal axis of the bristle carrier such that they overlap the bristles of the adjacent bristle bundles in a direction towards the second end of the cleaning brush. In this way, the new rotating cleaning brush is able to adapt its working region of the surface to be cleaned without having to stop the cleaning process.

The bristles of all or at least many bristle bundles may have the same length. In this case, due to the rounded design of the second end of the bristle carrier, they form a rounded tip. Due to this shape, it is possible to clean finely and deeply structured surfaces. The bristles being located closer to the second end are moved towards the first end when the pressure is increased, and the bristles being located closer to the first end get in contact with the surface to be cleaned. The working width of the cleaning brush is automatically increased. At the same time, the bristles being located closer to the first end counteract a further movement of the bristles being located closer to the second end in a stabilizing way. In this way, uncontrolled lateral movement of the cleaning brush is prevented.

Furthermore, the working region can be adapted by changing the rotational velocity of the driving shaft of the machine rotatingly driving the cleaning brush about the longitudinal axis. This is because of the centrifugal force resulting in the bristles bending in a radial direction of the bristle carrier when the number of rotations of the driving machine is increased. In this way, the working region is increased.

The new cleaning brush is especially suitable for cleaning rims of motor vehicles. However, it is also suitable for cleaning many other objects. For example, it can be used for cleaning carpets and seating surfaces. It can also be used to remove animal hair from seating furniture, automobile seats and so forth.

For cleaning surfaces having a rather fine and deep structure, it may be preferred that all bristles have the same length. In this way, the free ends of the bristles reproduce the round portion of the second end of the cylindrical or conical bristle carrier. During an increase of the pressure, the cleaning brush adapts to the surface to be cleaned.

For cleaning larger surfaces having a rather flat structure, it may be preferred that the free ends of the bristles end in one common surface. In this way, all bristles get in direct contact with the surface to be cleaned. When the pressure is increased, the bristles move towards the outside resulting in an enlargement of the working region.

The openings may be arranged in the shell surface of the bristle carrier in a circular configuration. In this way, the bristles being located closer to the first end support the bristles being located closer to the second end in a reliable and uniform way.

It is also possible that the openings are arranged in the shell surface of the bristle carrier in a conical configuration. The free ends of the bristles then commonly reproduce the conical structure of the bristle carrier and of the arrangement of the openings. In this way, when cleaning impressions on surfaces, dirt is removed from these impressions in an upward and outward direction.

The bristles may include at least two plastic fibers. The bristles may have free ends, and the plastic fibers may be designed such that they are spliced at the free ends. In this way, the cleaning brush is comparatively soft and suitable for cleaning sensitive surfaces without causing damage. The free ends are finer, and they can adapt to the surface to be cleaned in an improved way.

However, the bristles may also be made of a comparatively hard plastic material or even of metal wire if it is desired to clean less sensitive surfaces.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
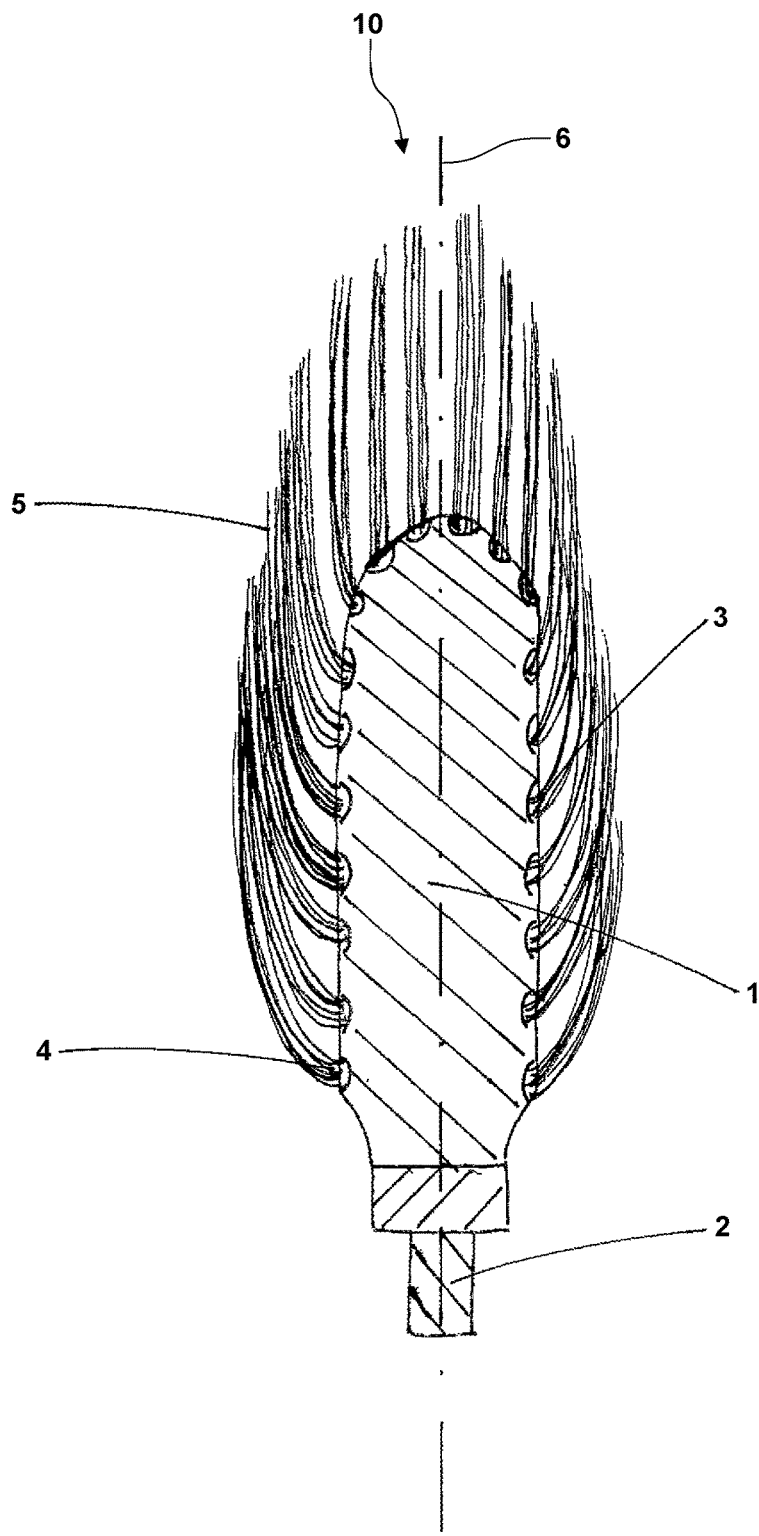
FIG. 1 illustrates a half-sectional view of a first exemplary embodiment of the new cleaning brush.

A new cleaning brush 10 including a cylindrical bristle carrier 1 having a rounded second end is illustrated in the drawings. The bristle carrier 1 could also have the shape of a rounded cone. A connection pin 2 is fixedly located in the region of the first end of the bristle carrier 1 as seen in the direction of the longitudinal axis 6 of the bristle carrier 1. The connection pin 2 is destined to be clamped in the chuck of a machine including a rotating drive shaft, for example a portable drill. Openings 3 are arranged in the shell surface of the bristle carrier 1.

As it is to be seen in FIG. 1, bristle bundles 4 are fixedly located in the opening 3. Each of the bristle bundles 4 includes a plurality of bristle 5. The bristles 5 are bent towards the longitudinal axis 6 of the bristle carrier 1 and the run parallel to the longitudinal axis 6. In this exemplary embodiment, all bristles 5 have the same length. The bristles 5 being located closer to the lower first end of the bristle carrier 1 overlap the bristles 5 being located closer to the upper second end of the bristle carrier 1. Due to this brush-like shape, the cleaning brush 10 is suitable for cleaning finely structured surfaces. When the pressure acting upon the cleaning brush 10 is increased, the upper bristles 5 move in a radial direction and the bristles 5 being located closer to the lower first end get in contact whit the surface to be cleaned. In this way, the working width of the cleaning brush 10 is increased. Consequently, the cleaning brush 10 is especially suitable for cleaning objects having differently structured surfaces, as for example automobile rims or garden furniture.

Figure 2:
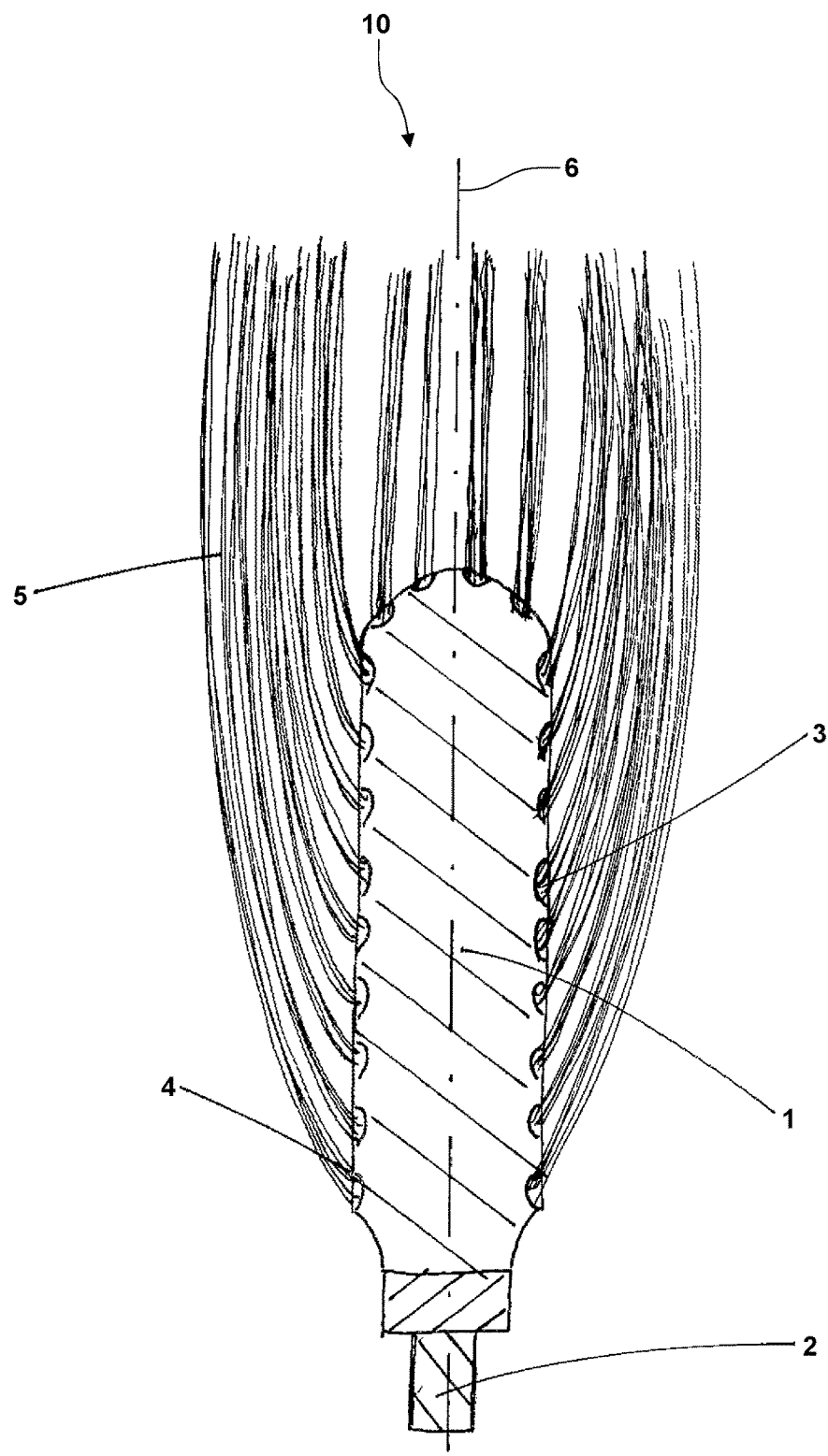
FIG. 2 illustrates a half-sectional view of a second exemplary embodiment of the new cleaning brush.

The exemplary embodiment of the new cleaning brush 10 illustrated in FIG. 2 differs from the one illustrated in FIG. 1 by the length of the bristles 5. The free ends of the bristles 5 are located in one common plane. All bristles 5 get in direct contact with the surface to be cleaned. Consequently, the working width of the cleaning brush 10 is large from the start. This embodiment of the cleaning brush 10 is suitable for cleaning larger surfaces rather than finely structured surfaces.

Figure 3:
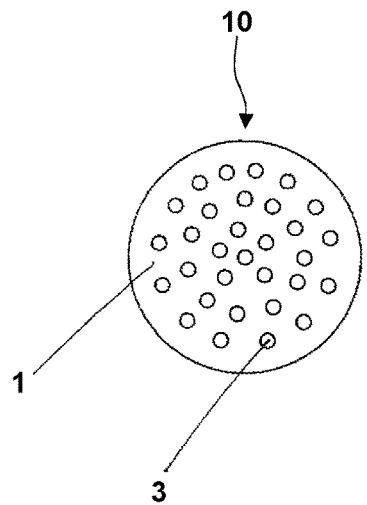
FIG. 3 illustrates a schematic top view of the bristle carrier of the cleaning brush of FIGS. 1 and 2 without bristles.

FIG. 3 illustrates the bristle carrier 1 including openings 3 being arranged about the shell surface of the bristle carrier 1 in an annular configuration. In this way, the bristle bundles 4 being located at the same height bundle their supporting effect acting upon the bristle bundles 4 being located in the adjacent upper ring.

Figure 4:
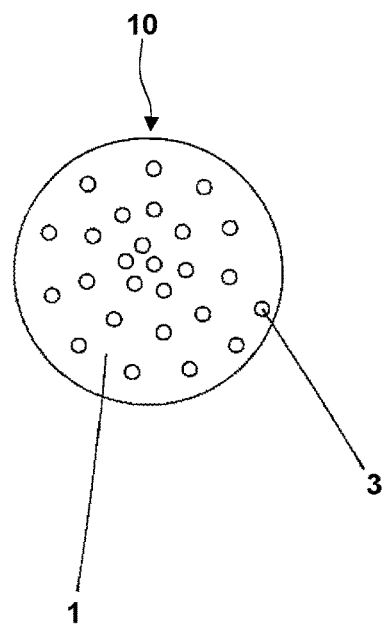
FIG. 4 illustrates a similar view as FIG. 3 of another embodiment of the cleaning brush including a different arrangement of the openings.

The exemplary embodiment of the cleaning brush 10 illustrated in FIG. 4 differs from the one illustrated in FIG. 3 by the openings 3 being arranged in the shell surface of the bristle carrier 1 in a conical configuration. The free ends of the bristles 5 reproduce the conical structure of the bristle carrier 1 and of the openings 3. In this way, dirt is removed from the surface to be cleaned in an upward and outer direction.

Many variations and modifications may be made to the preferred embodiments of the invention without departing substantially from the spirit and principles of the invention. All such modifications and variations are intended to be included herein within the scope of the present invention, as defined by the following claims.

I claim:

1. A cleaning brush configured to be rotated, the cleaning brush comprising:
   a longitudinal axis;
   a first end region;
   a second end region, the first end region and the second end region being spaced apart along the longitudinal axis;
   a connection pin arranged in the first end region, the connection pin being configured to be clamped in a chuck of a machine for rotatingly driving the cleaning brush about the longitudinal axis; and
   a bristle carrier comprising,
      a shell surface and a top surface, the top surface being located in the second end region and having a rounded shape,
      a plurality of openings arranged in the shell surface, and
      a first bristle bundle and a second bristle bundle arranged to be adjacent to each other along the longitudinal axis, the first bristle bundle being located closer to the first end region than the second bristle bundle, each of the first bristle bundle and the second bristle bundle comprising a plurality of bristles and being arranged in one of the plurality of openings,
   wherein,
      the bristles of the first bristle bundle bend towards the longitudinal axis and then run parallel to the longitudinal axis so as to overlap the opening in which the second bristle bundle is arranged.

2. The cleaning brush of claim 1, wherein the bristle carrier is designed to have a cylindrical shape.

3. The cleaning brush of claim 1, wherein the bristle carrier is designed to have a conical shape.

4. The cleaning brush of claim 1, wherein the bristles have an identical length.

5. The cleaning brush of claim 1, wherein the bristles include free ends, the bristles being designed and arranged such that the free ends are located in one common plane.

6. The cleaning brush of claim 1, wherein the plurality of openings are arranged in the shell surface of the bristle carrier in an annular configuration.

7. The cleaning brush of claim 1, wherein the plurality of openings are arranged in the shell surface of the bristle carrier in a helical configuration.

8. The cleaning brush of claim 1, wherein each bristle includes at least two plastic fibers.

9. The cleaning brush of claim 8, wherein the bristles include free ends, the plastic fibers being designed such that they are spliced at the free ends.

10. The cleaning brush of claim 1, wherein the bristles have a curved shape.

11. The cleaning brush of claim 1, wherein the bristle bundles further comprise:
a third bristle bundle arranged to be adjacent to the second bristle bundle along the longitudinal axis, the third bristle bundle being located closer to the second end region than the second bristle bundle, and
the bristles of the first bristle bundle bend towards the longitudinal axis and then run parallel to the longitudinal axis so as to overlap the opening in which the third bristle bundle is arranged.

12. The cleaning brush of claim 11, wherein the bristle bundles further comprise:
a fourth bristle bundle arranged to be adjacent to the third bristle bundle along the longitudinal axis, the fourth bristle bundle being located closer to the second end region than the third bristle bundle, and
the bristles of the first bristle bundle bend towards the longitudinal axis and then run parallel to the longitudinal axis so as to overlap the opening in which the fourth bristle bundle is arranged.

13. The cleaning brush of claim 1, wherein the bristles of the first bristle bundle are designed to bend towards the longitudinal axis and then run parallel to the longitudinal axis so as to overlap at least three openings being arranged closer to the second end region.

14. The cleaning brush of claim 1, wherein the bristles of the first bristle bundle are designed to bend towards the longitudinal axis and then run parallel to the longitudinal axis so as to overlap at least four openings being arranged closer to the second end region.

* * * * *